Dec. 13, 1949     I. MILLER ET AL     2,491,386
PHOTOGRAPHIC METHOD OF IMPRINTING
DESIGNS ON GLOBES
Filed March 16, 1945
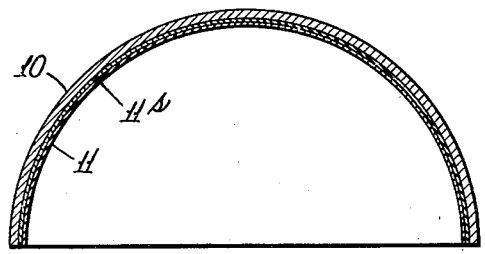
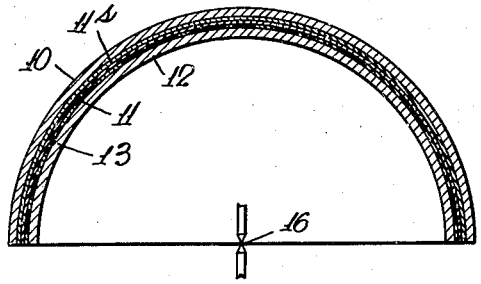
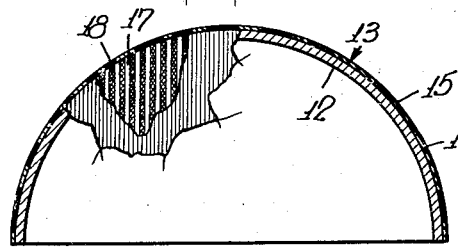
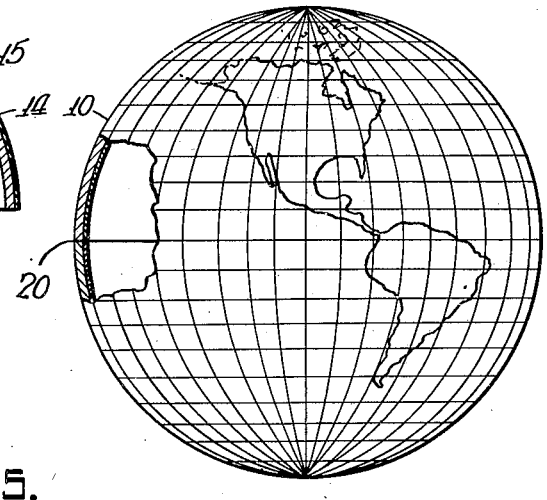
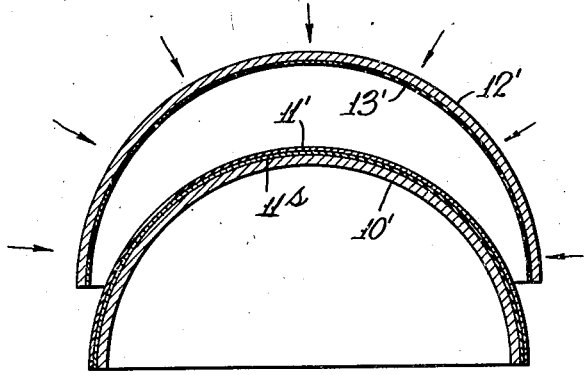
INVENTORS
*Isador Miller*
*William G. Marquette*
BY
*Dean Fairbank & Hirsch*
ATTORNEYS
45-53

Patented Dec. 13, 1949

2,491,386

UNITED STATES PATENT OFFICE 2,491,386

PHOTOGRAPHIC METHOD OF IMPRINTING A DESIGN ON GLOBES

Isador Miller, New York, and William G. Marquette, Pleasantville, N. Y., assignors to George Eisler, New York, N. Y.

Application March 16, 1945, Serial No. 583,070

8 Claims. (Cl. 95—5)

The present invention is concerned with the art of globes, and while its preferred application is to geographical globes, it could be applied to advantage to celestial globes, and to decorative globes.

It is among the objects of the invention to provide a globe which may be produced in quantities at moderate cost and which, on the one hand, avoids the need for individually painting the map upon each globe and, on the other hand, dispenses with individual segments or lunes of paper or of decalcomania film, and the difficulty of affixing the same upon the globe in edge-to-edge relation.

Another object is to provide a globe of the above type, of unusual attractiveness and clarity of map detail, without the confusion and inaccuracy at the joints between the lunar segments of conventional maps and in which the map bearing surface is physically protected from external contact and is yet exposed to view even at the areas on the remote or far side of the globe.

Another object is to provide a simple method for expeditiously producing a correct map with superlative clarity of detail in multiple color upon a globe, without the need for either three color printing and the attendant difficulties thereof, or for a screen, or for hand coloring operations, or other manipulation at the surface of the globe or shell.

In the accompanying drawings, in which are shown one or more of various possible embodiments of the several features of the invention, Fig. 1 is a view in longitudinal cross-section showing the hemispherical sensitized globe shell, Fig. 2 is a view similar to Fig. 1 of the corresponding matrix shell, Fig. 3 is a view in longitudinal cross section showing the method of imprinting the map upon the globe, Fig. 4 is a front view of the completed globe with parts broken away, showing merely general outlines, the legends and details being omitted, and Fig. 5 is a view similar to Fig. 3 but with the matrix spaced from the shell, showing another method of imprinting the latter.

Referring now to the drawings, there is shown a transparent hemispherical shell 10 of suitable material, such as glass, but preferably of plastic such as cellulose acetate or Lucite. One face of said shell, shown in Fig. 1 as the inner face, is coated with a light sensitive film 11, which in the case of a soft film such as one of gelatin, may be suitably hardened as in Formalin, before, after, or both before and after it is sensitized, thereby to protect it against mechanical injury.

A matrix shell 12 of transparent material similar to shell 10 and of diameter but slightly different from that of the shell 10, in the embodiment of Figs. 1 to 3 slightly smaller, has the map or other representation or picture 13 on that face thereof which can engage the light-sensitive film 11 in face-to-face relation. In the embodiment shown, that map would be on the outer surface of the matrix shell, as shown. The map may be painted or otherwise applied to the matrix shell, various areas being of selected opacity or transparency. The land areas 14 by way of example, may be shown transparent and the water areas 15 opaque. The matrix 12 and the film-carrying shell 10 being nested, as shown in Fig. 3 with the map 13 in contact with the film 11, the film is exposed to light of suitable character and intensity passed through the matrix shell 12 and the map 13 thereon. Preferably the light source is an arc lamp 16 which, in the particular embodiment shown, is placed at the center of curvature of the matrix so as to reach all areas of the map on the matrix shell with uniform intensity and, therefore, expose the film to degree accurately corresponding to the transparency of the map areas in contact therewith.

The exposed film 11 is thereupon subjected to suitable washes to remove the light sensitizing material from the unexposed areas of the film. Finally, the shell is treated with a suitable dye or dyes that have selective efficacy, as between the exposed and unexposed areas of the film. After suitable setting, the map or other representation thus becomes accurately imprinted upon the globe in at least the two differentiated colors imparted by the selective dye, respectively upon the exposed and the unexposed areas of the film.

By providing intermediate degrees of opacity in the matrix map, the effect of intermediate colors could also be produced on the film.

Thus by providing a matrix with areas that are substantially completely opaque, other areas that are substantially completely transparent, and a third set of areas that are translucent, that is, that are intermediate in their light transmitting efficacy between the two sets of areas first mentioned, and by illustratively dyeing the exposed areas blue and the unexposed areas yellow, the intermediate areas will take a composite coloration of blue and yellow, viz., of green.

It is possible to obtain the three-color effect by a single dye bath of the type that dyes chrome-tanned gelatin in one color and the untanned gelatin film in a distinctly different color. Where, as suggested in Fig. 2, certain parts of the matrix have narrow areas 17 thoroughly transparent for complete light transmission, and associated narrow areas 18 thoroughly opaque for complete light interception, said areas being in a predetermined recurring sequence, it will be apparent that the corresponding region of film will, to the eye, have the composite color effect produced by the mixture of the two colors above referred to, that are simultaneously produced on the exposed and unexposed film areas, respectively. Thus, if a dye be used that colors the exposed areas blue and the unexposed areas red, then the regions on the film corresponding to 17, 18 on Fig. 2 will appear to the eye to be of a color the composite of blue and red, viz., some shade of purple.

While all of the effects above discussed may be attained by the use of a completely transparent, colorless globe, a variety of modified effects may be attained by utilization of a transparent globe or shell of a distinct coloration. In many cases, a thus colored globe will render more attractive and more brilliant the appearance of the diversely colored film viewed therethrough, than where a colorless transparent globe is employed.

By way of example, where certain dyes are used, of which an example is given hereinafter, to color the exposed sections blue, should the process be so conducted that the unexposed areas take on an undesired blue tinge, the use of a transparent globe of a suitable yellow coloration as the carrier for the film, will cause the blue from the unexposed area to be suppressed, so that such areas will have the yellow coloration of the shell, while the blue areas on the exposed film will compound with the yellow on the shell to afford an attractive shade of green to such areas.

With the use of a colored transparent globe or shell such as above set forth, it will be understood that it might be possible completely to dissolve out the unexposed areas of gelatin by the use of hot water without affecting the exposed gelatin areas, if the latter are tanned to sufficient degree to be substantially insoluble in hot water. Where such practice is followed, the areas of the globe from which the gelatine has been removed will have solely the coloration of the globe or shell, it being understood that in that case the globe or shell would be of color contrasting with that used for dyeing the exposed insolubilized gelatin film areas.

After the two hemispheres have been imprinted in the manner set forth, they are brought into rim to rim engagement at 20 and in proper longitudinal registry and are cemented together.

As shown in Fig. 5, the matrix 12' might have the map 13' or other design on its concave surface for imprinting upon the light sensitized film 11' on the outer or convex surface of a hemispherical shell 10' slightly smaller in diameter than the matrix and which may be of either transparent or opaque material. In such externally imprinted map, a distributed light, the rays of which are indicated by arrows, would, of course, be used for reasonable uniformity of exposure. Otherwise, the embodiment of Fig. 5 is the same as that of Figs. 1 to 4.

The mechanical features of the invention have been set forth in sufficient detail. Illustrative examples of the photochemical aspects of the invention will now be given.

The photosensitive film 11 or 11' may be of gelatin, glue, modern plastic or similar materials. It is commonly sensitized in the dark in a solution of bichromate, desirably ammonium bichromate, which is allowed to dry on the film.

In the exposure to light through the map or other picture on the matrix, the gelatin or other film will be chrome-tanned in proportion to the amount of light which has impinged thereon. After such exposure, washing of the film on the shell in cold water results in dissolving out the uncombined bichromate in so much of the film as had been shielded by opaque portions of the map, leaving the layer of gelatin or the like substantially in its original condition, the portion that had been subjected to light being hardened, insolubilized or chrome-tanned more or less in proportion to the amount of exposure. There is thus produced a rather faint image in the gelatin film or the like, which is now practically stable to light.

In one embodiment, the color of the exposed film areas may be distinguished from that of the unexposed film areas by a single bath in any of a variety of dyestuffs of the type that are fixed by a chrome mordant.

Such dyestuffs when applied in aqueous solution to the exposed film which is first washed in water to dissolve out the soluble chromate will be fixed or set by the mordant action of the bichromate fixed in the exposed areas, and will be unaffected at the unexposed areas that are devoid of bichromate. Accordingly, after washing the shell with the dyed film, there will be the desired contrast of colors between the exposed and the unexposed areas thereof.

An example of such dyestuffs is "Chromoxane Pure Blue B. A. New" (Color Index No. 729) of General Dyestuff Corporation. Another example is "Calcochrome Brilliant Blue BBG" of Calco Chemical Division of American Cyanamid Company.

Where either of these dyestuffs is applied in concentrated aqueous solution of about 3 per cent, the entire film will color a deep ruby red. Upon washing in warm water, the light-exposed areas turn blue, whereas the areas that had not been exposed to light remain red.

Instead of the concentrated solution above referred to, an extremely dilute solution of either of the above identified dyestuffs may be used, a solution having a light port wine to straw color. In that procedure, the dyestuff will affect the light exposed area only, coloring it blue and will leave the unexposed areas all but colorless.

Thus, by the foregoing procedure, the exposed areas may be dyed blue and the unexposed areas dyed red or left uncolored as desired, and this with but a single exposure to light and a single dye bath. By appropriately hardening the film before light sensitization thereof or by appropriately adjusting the exposure to light, or by a combination of such proceedings, the dyeing with the above specified dyestuffs may be reversed, so that the dye accumulates in the unexposed rather than on the exposed areas of the film.

It is possible also, selectively to color unexposed areas with any of a variety of dyes that have an affinity therefor and that will not affect the exposed or hardened areas. Thus, the exposed areas may be left undyed, or if desired they may be dyed as above set forth. By way of example, the exposed and washed film may be treated with "Milling Yellow H5G" or "Direct Yellow 73 Extra 4849," both made by General Dyestuff Corporation, to dye the unexposed portions yellow. This treatment may be preceded, if desired, by the treatment previously described to dye the exposed portions blue.

It is possible, of course, to obtain intermediate color effects of any desired intensity, by the intermediate translucency of areas of the matrix, or by arranging narrow areas of complete light transmission and of complete light interception on the matrix in any predetermined recurring sequence, as above set forth.

One detailed example of a procedure for making transparent colored globes in accordance with the present invention will now be outlined.

On the inside of a glass or transparent plastic shell, such for instance as one of cellulose acetate as in Fig. 1, there is deposited a uniform layer 11 of gelatin, similar to that used in commercial portrait films. Desirably an intermediate "subbing solution" 11s is used to ensure good adhesion. After drying, the film is sensitized by bathing in a solution of bichromate, desirably a two and one half (2½%) per cent aqueous solution of ammonium bichromate, say for three minutes, and then dried. Before such sensitizing operation, the film may be immersed to advantage for a few minutes in a dilute solution of Formalin, to render it less subject to injury.

Into the dried sensitized hemisphere, there is introduced the matrix hemisphere, upon the outer surface of which the map is painted or otherwise coated with areas of different opacity. The light, desirably an arc lamp 16 with its carbon arc at the center of curvature of the matrix hemisphere, is applied for say four minutes, when a globe 10 inches in diameter is involved. The film-bearing shell is then washed in cold water for, say three minutes, and allowed to dry, thereby washing out the bichromate from those areas that had not been exposed. The film is now placed in an aqueous solution of "Chromoxane Pure Blue A. B. New" in aqueous solution of light port wine color. It is removed from the bath when the light-exposed areas are well colored and the unexposed areas are not noticeably colored. The length of time to this end will vary inversely with the temperature of the bath. The shell, with the colored film thereon, is now rinsed in warm water and then immersed in a warm concentrated aqueous solution of "Direct Yellow 73 Extra 4849," to which has been added 25 per cent ethyl alcohol. When the light-exposed portions are sufficiently colored yellow, the shell is rinsed in warm water and dried. Before drying, the shell could be placed in a bath of dilute Formalin, if desired, to harden the film and further fix the dyes.

By reason of the fact that the light print in each embodiment is on the face of the shell which is opposed to that matrix face that bears the map, an exact and not a mirror image of the matrix map will be exposed to view on the globe.

It will be seen that an unusually accurate and sharply defined map is produced by the method set forth, and in the preferred embodiment, in which it is photographed on the inner wall of the globe shell, the map is completely protected from dust or dirt and the shell may be washed on the exterior without danger of wearing away or impairing the freshness of the color or legends on the map.

While it is preferred to place the map on the matrix in physical engagement with the film during exposure, as shown and described, it will be understood that within the scope of the invention from its broader aspects, the thickness of the matrix shell, or the thickness of the map globe shell, or both thicknesses, could be interposed between the map on the matrix and the film during exposure. The outline of the map would, of course, be less sharp in such practice.

It will be understood that those skilled in the art of color photography may apply the foregoing teachings and produce any of a wide variety of color effects, of which the foregoing are but illustrative.

Any or all of the map areas on the globe may be coated with fluorescent paint, if desired, to glow in the dark, or if desired, the interior of the globe may be equipped with a miniature electric bulb of ordinary or ultra violet type to project light through the globe for a variety of effects including enhanced legibility and decorative appeal.

It will be evident that the process may be applied, if desired, to sectors, segments or other portions or areas, instead of the entire surface of a globe. Such transparent segments are of considerable utility for plotting in navigation.

The term "geographical globe" as used in the claims is, of course, generic to celestial globes and other equivalent structures.

As many changes could be made in the above construction and method, and many apparently widely different embodiments of this invention would be made without departing from the scope of the claims, it is intended that all matter contained in the above description or shown in the accompanying drawings shall be interpreted as illustrative and not in a limiting sense.

Having thus described our invention, what we claim as new and desire to secure by Letters Patent of the United States is:

1. The method of preparing a geographical globe, which consists in applying a photosensitive film to the inner surface of a hemispherical transparent shell, applying to the complementary surface of a nesting transparent matrix shell, a map with areas of distributed opacity and transparency, nesting said shells to bring the map into contact with the sensitized film, and exposing the latter to light passed through said matrix, and thereupon washing the exposed film to free the unexposed areas thereof of the sensitizing agent.

2. The method of fabricating a geographical globe, which consists in forming a photosensitive film on the inner or concave surface of a transparent hemispherical shell, applying a map with areas of selected opacity and transparency upon the outer or convex surface of a transparent matrix shell of dimensions to nest snugly against the sensitized film, nesting said shells and exposing the film by passing light from the interior of the matrix shell through the map, removing the imprinted shell, and washing the same to desensitize the unexposed areas thereof.

3. The combination recited in claim 2, in which the exposing light is an arc lamp disposed substantially at the center of the matrix shell.

4. The method of fabricating geographical globes, which consists in depositing on the inside of a transparent, hemispherical shell a light-sensitized film of uniform thickness, introducing into said shell and against said film the map-bearing surface of a hemispherical transparent complementary matrix shell, exposing the interior of the latter shell to light, washing the film-bearing shell, and selectively dyeing light-exposed and unexposed portions of the film.

5. The method of fabricating geographical globes, which consists in depositing on the inside of a transparent hemispherical shell a light-sensitized film of uniform thickness, introducing into said shell and against said film the map-bearing surface of a hemispherical transparent complementary matrix shell, exposing the interior of the matrix shell to light, washing the film-bearing shell, and selectively dyeing light-unexposed portions with a color distinct from that of the exposed portions.

6. The method of fabricating a transparent geographical globe, which consists in depositing on the inside of a hemispherical shell a light-sensitive film, nesting therein and in physical contact therewith, a transparent hemispherical matrix shell having on the outer surface thereof areas of different degrees of opacity and translucency corresponding to the map areas to be shown, exposing the film to light passed through the matrix shell, and subjecting the exposed film to one or more dye baths of selective efficacy for discriminating coloration of the areas of different degrees of light exposure.

7. The method of fabricating a geographical globe, which consists in depositing on the inside of a hemispherical shell a light-sensitive film, nesting therein and in physical contact therewith, a transparent matrix shell having on the outer surface thereof areas of different degrees of opacity and translucency, exposing the film to light passed through the matrix shell from a source at the center thereof, subjecting the exposed film to one or more dye baths of selective efficacy for discriminating coloration of the areas of different degrees of light exposure, and thereupon setting the dyed film.

8. The method of forming a transparent geographical globe, which consists in applying to one face of a transparent hemispherical area a uniform layer of gelatin, drying the film, sensitizing the same in a bichromate solution and then drying, contacting the sensitized film with a transparent hemispherical matrix shell with areas thereon of distinct opacity and transparency, exposing the entire film simultaneously to light passed through said matrix, washing the film in cold water, drying, and then subjecting the film to contrasting dye colors discriminating between exposed and unexposed film.

ISADOR MILLER.
WILLIAM G. MARQUETTE.

REFERENCES CITED

The following references are of record in the file of this patent:

UNITED STATES PATENTS

| Number | Name | Date |
| --- | --- | --- |
| Re. 8,543 | Marsh | Jan. 21, 1879 |
| 441,086 | Dobinson | Nov. 18, 1890 |
| 649,079 | Sewell | May 8, 1900 |
| 885,453 | Didier | Apr. 21, 1908 |
| 946,470 | Spath | Jan. 11, 1910 |
| 1,422,642 | Walters | July 11, 1922 |
| 1,630,916 | Wittenberg | May 31, 1927 |
| 1,634,658 | Flammer | July 5, 1927 |
| 2,083,988 | Dupler | June 15, 1937 |
| 2,204,147 | Murray | June 11, 1940 |
| 2,290,478 | Matlas | July 21, 1942 |
| 2,333,251 | Huggins | Nov. 2, 1943 |
| 2,379,468 | Arnold | July 3, 1945 |

FOREIGN PATENTS

| Number | Country | Date |
| --- | --- | --- |
| 1,089 of 1861 | Great Britain | May 1, 1861 |
| 29,605 | Great Britain | Dec. 31, 1904 |
| 110,181 | Great Britain | of 1917 |

OTHER REFERENCES

Wright: "Surface Features of the Moon," The Annual Report of the Smithsonian Institution, 1935, page 177 cited.